(12) United States Patent
Liberty et al.

(10) Patent No.: US 11,061,753 B2
(45) Date of Patent: Jul. 13, 2021

(54) PLATFORM FIRST ERROR HANDLING

(71) Applicant: Advanced Micro Devices, Inc., Santa Clara, CA (US)

(72) Inventors: Dean A. Liberty, Nashua, NH (US); Vilas K. Sridharan, Brookline, MA (US); Michael T. Clark, Austin, TX (US); Jelena Ilic, Austin, TX (US); David S. Christie, Austin, TX (US); James R. Williamson, Austin, TX (US); Cristian Constantinescu, Fort Collins, CO (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 16 days.

(21) Appl. No.: 15/940,693

(22) Filed: Mar. 29, 2018

(65) Prior Publication Data

US 2019/0303230 A1  Oct. 3, 2019

(51) Int. Cl.

| G06F 11/07 | (2006.01) |
| G06F 9/48 | (2006.01) |
| G06F 9/455 | (2018.01) |
| G06F 9/30 | (2018.01) |

(52) U.S. Cl.
CPC ...... *G06F 11/0772* (2013.01); *G06F 9/30098* (2013.01); *G06F 9/45558* (2013.01); *G06F 9/4812* (2013.01); *G06F 11/0724* (2013.01); *G06F 2009/45579* (2013.01); *G06F 2009/45583* (2013.01)

(58) Field of Classification Search
CPC .. G06F 11/07; G06F 11/0781; G06F 11/0772; G06F 9/4818; G06F 9/45533; G06F 11/1482
See application file for complete search history.

(56) References Cited

U.S. PATENT DOCUMENTS

| 7,146,477 | B1 * | 12/2006 | Strongin ............. G06F 12/1475 711/163 |
| 7,269,768 | B2 | 9/2007 | Rothman et al. |
| 8,839,032 | B2 * | 9/2014 | Walton ................ G06F 11/0712 709/224 |
| 2002/0133655 | A1 * | 9/2002 | Falik .................... G06F 13/387 710/200 |

(Continued)

*Primary Examiner* — Matthew M Kim
*Assistant Examiner* — Kurosu Risa Altaf
(74) *Attorney, Agent, or Firm* — Kowert Hood Munyon Rankin and Goetzel PC; Rory D. Rankin

(57) ABSTRACT

Systems, apparatuses, and methods for implementing a hardware enforcement mechanism to enable platform-specific firmware visibility into an error state ahead of the operating system are disclosed. A system includes at least one or more processor cores, control logic, a plurality of registers, platform-specific firmware, and an operating system (OS). The control logic allows the platform-specific firmware to decide if and when the error state is visible to the OS. In some cases, the platform-specific firmware blocks the OS from accessing the error state. In other cases, the platform-specific firmware allows the OS to access the error state such as when the OS needs to unmap a page. The control logic enables the platform-specific firmware, rather than the OS, to make decisions about the replacement of faulty components in the system.

20 Claims, 8 Drawing Sheets

(56) References Cited

U.S. PATENT DOCUMENTS

| | | | |
|---|---|---|---|
| 2006/0143515 A1* | 6/2006 | Kuramkote | G06F 11/366 714/15 |
| 2007/0061634 A1* | 3/2007 | Marisetty | G06F 11/0793 714/48 |
| 2008/0005615 A1* | 1/2008 | Brenden | G06F 11/0793 714/13 |
| 2014/0237299 A1* | 8/2014 | Nachimuthu | G06F 11/0772 714/42 |
| 2019/0251297 A1* | 8/2019 | Khan | G06F 21/572 |

* cited by examiner

PLATFORM FIRST ERROR HANDLING

BACKGROUND

Description of the Related Art

A typical modern computing system often includes multiple different software modules running on the system. Software modules include (but are not limited to) an operating system (OS), hypervisor, system management mode (SMM) software, platform-specific firmware, software applications, drivers, and so on. As used herein, the term "firmware" refers to permanent software programmed into a non-volatile memory (e.g., read-only memory (ROM)). In some implementations, the "firmware" acts as an interface between software and hardware components of a computing system, among other roles.

In a given computing system, two or more software and/or firmware modules might want access to the errors that occur on the system. Information about errors (e.g., corrected and uncorrected error logs, deferred error logs) that occur on the system is referred to herein as "error state", "system error state", "platform error state", or "hardware error state". In some systems, the error state is stored in a set of physical registers. When multiple software and/or firmware modules want access to the error state, coordinating access to the error state can be challenging. Often the software and/or firmware modules are not able to communicate with each other in a simple, straightforward manner. This prevents the software and/or firmware modules from coordinating access to the error state.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF IMPLEMENTATIONS

Figure 1:
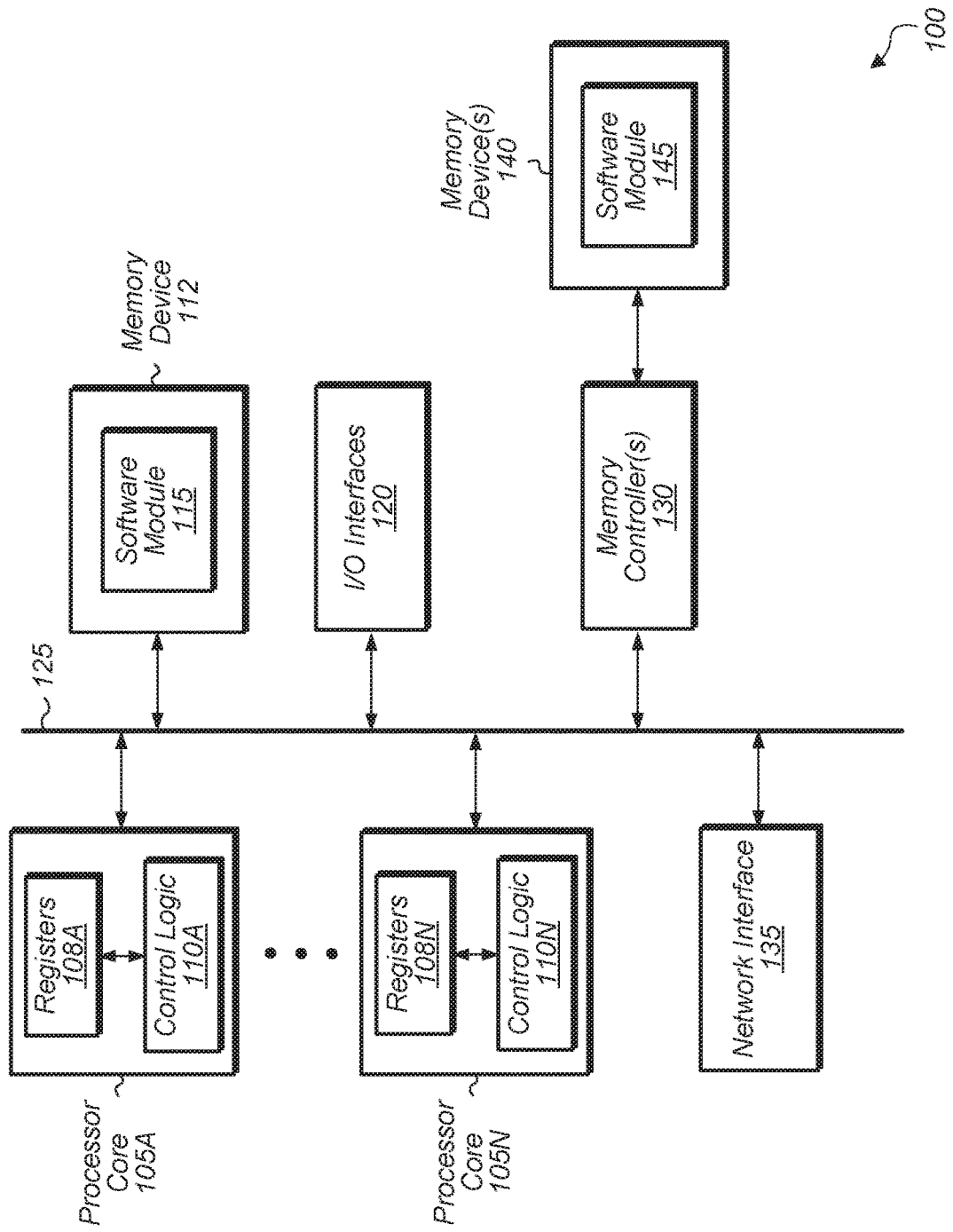
FIG. 1 is a block diagram of one implementation of a computing system.

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, methods, and computer-readable mediums for implementing hardware enforced firmware-first access to a system error state are disclosed herein. In one implementation, a computing system includes at least one or more processor cores, one or more memory devices, a plurality of registers, and control logic for controlling access to the error state of the system. Multiple software and/or firmware modules execute on the computing system. For example, a platform-specific firmware module runs on the system, with the platform-specific firmware module having detailed knowledge of the underlying hardware of the system. While in one implementation the platform-specific firmware module includes program instructions that execute on the processor core(s), in other implementations the platform-specific firmware includes program instructions that execute on a microcontroller separate from the processor core(s), or otherwise.

Additionally, a software module (e.g., an operating system (OS)) runs on the system. The OS is more generic than the platform-specific firmware module and does not have as detailed a view of the underlying hardware as the platform-specific firmware module. Accordingly, in some cases, the platform-specific firmware module is better able to understand the errors that are occurring on the system than the software module. Still further, any number of other software modules also run on the system. In various implementations, the control logic includes mechanisms for enforcing coordinated access to the error state by the firmware module and software module(s) without requiring the software module(s) to opt-in to a coordination agreement.

In one implementation, the control logic enforces a specific priority of accesses to the error state of the system. In one implementation, the control logic includes an enforcement mechanism to allow the platform-specific firmware module to control and/or prevent access to the error state by the software module(s). In other words, the control logic allows the platform-specific firmware module to have a higher priority than the software module(s) for accessing the error state. In one implementation, the control logic also allows the platform-specific firmware module to decide whether to allow the software module(s) access to the error state. Accordingly, the control logic gives the firmware module the option of blocking access to the error state by the software module(s). In this implementation, the firmware module chooses how and when the software module(s) have access to the error state, with the enforcement of the firmware module's choices handled by the control logic.

In one implementation, the firmware module stipulates that the software module never sees any of the error state. In another implementation, the firmware module selectively lets the software module see the error state. In one implementation, the firmware module programs the control logic to control the visibility of error state. In this implementation, the firmware module also controls the notification policy (i.e., which firmware and/or software module(s) get notified when an error occurs). In one implementation, the control logic ignores any requests by the software module to change the settings programmed by the firmware module. For example, the software module might try to override the settings programmed by the firmware module by changing the visibility into error state and/or the notification policy. In response to detecting an attempt by the software module to change the visibility or notification settings, the control logic prevents the software module from changing these settings.

Referring now to FIG. 1, a block diagram of one implementation of a computing system 100 is shown. In one implementation, computing system 100 includes at least processor cores 105A-N, memory device 112, input/output (I/O) interfaces 120, bus 125, memory controller(s) 130, network interface 135, and memory device(s) 140. In other implementations, computing system 100 includes other components and/or computing system 100 is arranged differently.

Processor cores 105A-N are representative of any number of processor cores which are included in system 100. In one implementation, processor cores 105A-N are part of a general purpose processor, such as a central processing unit (CPU). In other implementations, processor cores 105A-N are part of other types of processors (e.g., graphics processing units (GPUs), digital signal processors (DSPs), field programmable gate arrays (FPGAs), application specific integrated circuits (ASICs)). In some implementations, processor cores 105A-N include CPU cores, GPU cores, and/or other types of processor cores. Each processor core 105A-N includes a corresponding set of registers 108A-N. Each set of registers 108A-N stores a variety of values including (but not limited to) error state values, status values, configuration values, error thresholding values, and so on.

Each processor core 105A-N also includes corresponding control logic 110A-N which enforces a policy for software modules 115 and 145 to coordinate access to the error state of processor cores 105A-N. It is noted that control logic 110A-N is also referred to as "microcode" herein. In one implementation, one of software modules 115 and 145 is given priority over the other software module(s) in accessing the error state. This software module which has priority is able to prevent the other software module(s) from accessing the error state. The software module with priority is also able to allow the other software module(s) to selectively access portions of the error state. In one implementation, software module 115 is a firmware module and software module 145 is an operating system (OS). In one implementation, control logic 110A-N prevents the OS from accessing registers 108A-N, respectively, without the permission of the firmware module. In other words, control logic 110A-N allows the firmware module to control access to registers 108A-N, respectively.

Software modules 115 and 145 are representative of any number and type of software modules that are included within system 100. In one implementation, software modules 115 and 145 include program instructions that are executable on processor cores 105A-N. While two software modules 115 and 145 are shown in system 100, it should be understood that in other implementations, system 100 includes other numbers of software modules stored in any of various locations throughout the system 100. In one implementation, software module 115 includes platform-specific firmware while software module 145 is an operating system (OS). In other implementations, software module 115 and/or software module 145 are other types of software modules. It is noted that software module 115 is also referred to herein as a "firmware module". Additionally, software module 115 is also referred to as a "first software module" and software module 145 is referred to as a "second software module" herein.

Memory device 112 is representative of any number and type of memory devices. In one implementation, memory device 112 is a read-only memory (ROM). In other implementations, memory device 112 is any of various other types of memory devices. Memory controller(s) 130 are representative of any number and type of memory controllers accessible by processor cores 105A-N and I/O devices (not shown) coupled to I/O interfaces 120. Memory controller(s) 130 are coupled to any number and type of memory devices(s) 140. Memory device(s) 140 are representative of any number and type of memory devices. For example, the type of memory in memory device(s) 140 includes Dynamic Random Access Memory (DRAM), Static Random Access Memory (SRAM), NAND Flash memory, NOR flash memory, Ferroelectric Random Access Memory (FeRAM), or others.

I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices (not shown) are coupled to I/O interfaces 120. Such peripheral devices include (but are not limited to) displays, keyboards, mice, printers, scanners, joysticks or other types of game controllers, media recording devices, external storage devices, network interface cards, and so forth. Network interface 135 is used to receive and send network messages across a network.

In various implementations, computing system 100 is a computer, laptop, mobile device, game console, server, streaming device, wearable device, or any of various other types of computing systems or devices. It is noted that the number of components of computing system 100 varies from implementation to implementation. For example, in other implementations, there are more or fewer of each component than the number shown in FIG. 1. It is also noted that in other implementations, computing system 100 includes other components not shown in FIG. 1. Additionally, in other implementations, computing system 100 is structured in other ways than shown in FIG. 1.

Figure 2:
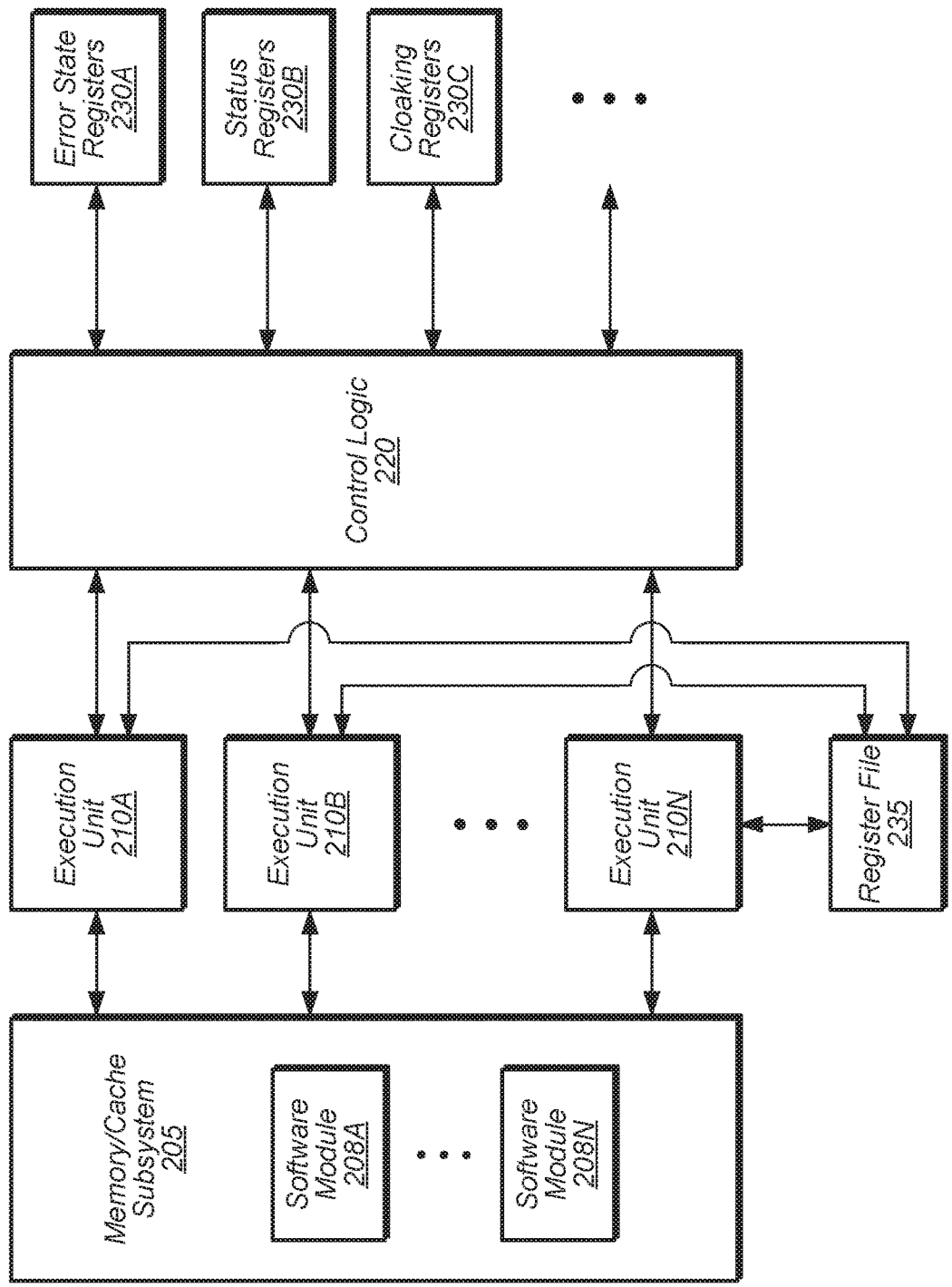
FIG. 2 is a block diagram of another implementation of a portion of a computing system.

Turning now to FIG. 2, a block diagram of one implementation of a portion of a computing system 200 is shown. In one implementation, system 200 includes at least memory/cache subsystem 205, execution units 210A-N, control logic 220, and registers 230A-C. Memory/cache subsystem 205 is representative of any number and type of cache devices and/or memory devices. Memory/cache subsystem 205 stores any number of software modules 208A-N. In one implementation, software modules 208A-N include a platform-specific firmware module, an operating system, and/or one or more other software modules (e.g., software applications, drivers, system software). Each software module 208A-N includes program instructions which are executable by one or more of execution units 210A-N. Alternatively, one or more of execution units 210A-N are fixed function hardware units (e.g., FPGA, ASIC). For fixed function hardware units, a given software module 208A-N is the hardware description language representation of the code used to program and/or fabricate the fixed function hardware unit.

System 200 also includes any number and type of registers 230A-C for storing values indicative of system state, error state, status, configuration settings and so on. These registers include error state registers 230A, status registers 230B, cloaking registers 230C, and so on. The registers 230A-C are also referred to as the "error state" of the system. Control logic 220 enables access to the error state based on settings in status registers 230B and cloaking registers 230C, with the settings programmed by a highest priority software module of software modules 208A-N. In one implementation, the software module 208A-N with the highest priority is a firmware module. In other implementations, another type of software module is the highest priority software module. It is noted that execution units 210A-N also have access to a separate physical register file 235, the registers of which are accessible without going through control logic 220. The register file 235 includes physical registers which are mapped from architectural registers, with registers of register file 235 being utilized in the execution of instructions.

When a given execution unit 210A-N executes a program instruction which attempts to access the error state, control logic 220 detects and intercepts the attempt. Control logic 220 handles the attempted access in different ways depending on a variety of factors. In one implementation, control logic 220 handles the attempted access differently depending on which software module 208A-N is responsible for the access. If the software module 208A-N with the highest priority is attempting the access, control logic 220 allows the access to proceed. On the other hand, if a software module 208A-N with a relatively low priority is attempting the access, control logic 220 determines whether to allow or block the access based on settings programmed by the highest priority software module 208A-N. Control logic 220 is implemented using any suitable combination of hardware and/or software. In one implementation, control logic 220 is implemented as microcode within a processor core. In another implementation, control logic 220 is implemented as fixed function hardware within system 200. In other implementations, control logic 220 is implemented in other suitable manners.

In one implementation, control logic 220 determines how to handle an attempted access of the error state based at least in part on the settings programmed into status registers 230B and cloaking registers 230C. In one implementation, the highest priority software module of software modules 208A-N is responsible for programming the settings into status registers 230B and cloaking registers 230C. For example, values programmed into status registers 230B and cloaking registers 230C are used to determine whether the lower priority software module(s) 208A-N are allowed access to view and/or change the error state of system 200. It is noted that these values programmed into status registers 230B and cloaking registers 230C are inaccessible to the lower priority software module(s). In one implementation, inaccessible is defined as not being readable and not being writeable by the lower priority software module(s). In another implementation, inaccessible is defined as not being writeable by the lower priority software module(s) while still being readable by the lower priority software module(s).

In one implementation, control logic 220 determines how to handle an attempted access of the error state based at least in part on the type of access being attempted. In one implementation, control logic 220 handles read accesses in a different manner from write accesses. In some cases, control logic 220 allows read accesses to certain portions of the error state while blocking write accesses to other portions of the error state. In one implementation, the portions of error state which are readable by lower priority software modules are programmed into status registers 230B and cloaking registers 230C. It is noted that in other implementations, system 200 is organized in other suitable manners for allowing control logic 220 to manage accesses to the error state of system 200. In these implementations, system 200 includes other combinations of circuitry, registers, execution units, and the like.

Figure 3:
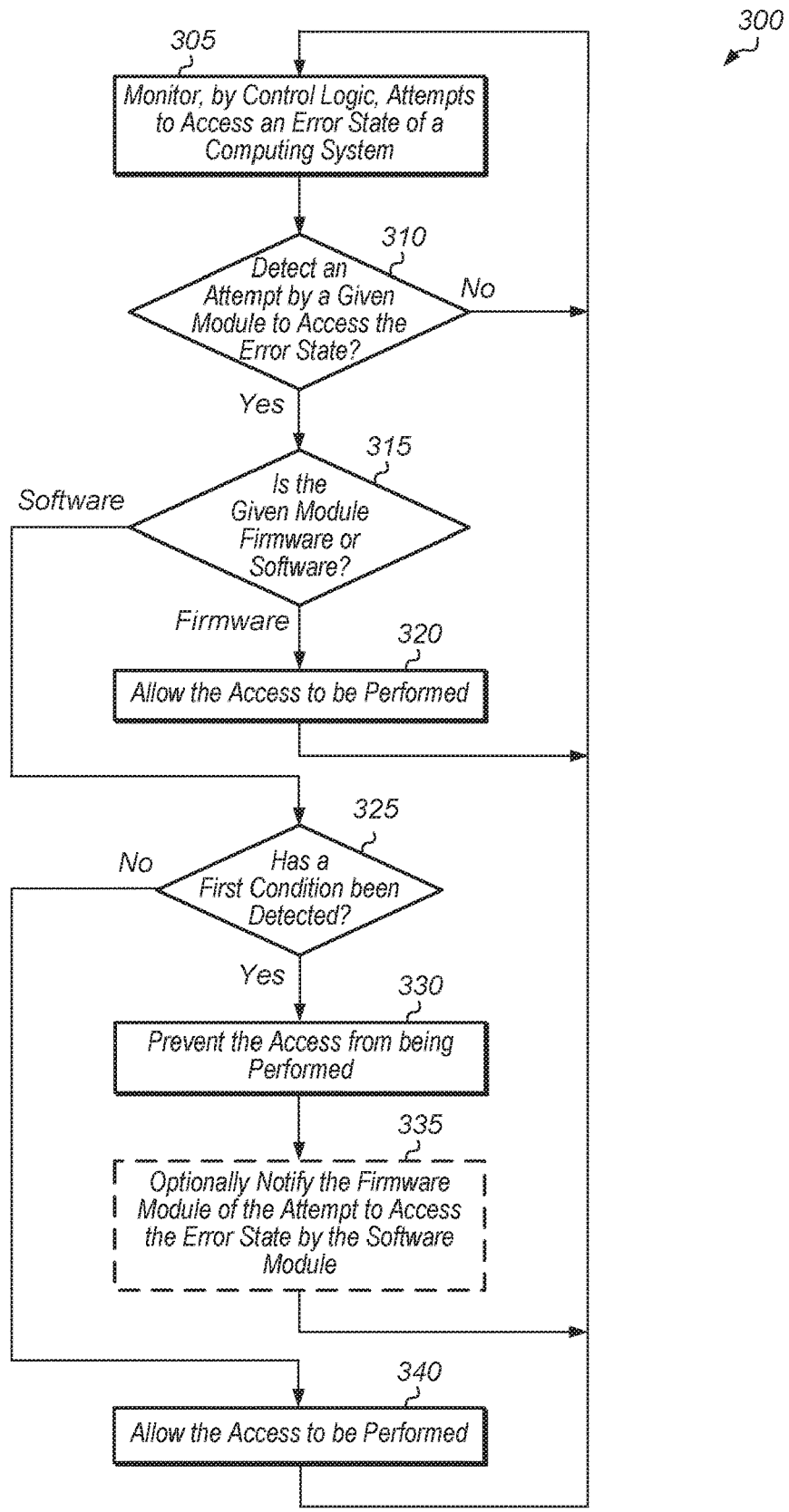
FIG. 3 is a generalized flow diagram illustrating one implementation of a method for implementing firmware control of error-state via a hardware enforcement mechanism.

Referring now to FIG. 3, one implementation of a method 300 for implementing firmware control of error-state via a hardware enforcement mechanism is shown. For purposes of discussion, the steps in this implementation and those of FIG. 4-8 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 300.

Control logic monitors attempts to access an error state of a computing system (block 305). In various implementations, it is noted that an attempt to access the error state is an attempt to read the error state or an attempt to modify the error state of the system. If the control logic detects an attempt by a given module to access the error state (conditional block 310, "yes" leg), then the control logic determines if the access is being attempted by a firmware module or a software module (conditional block 315). In another implementation, the control logic determines if the access is being attempted by software of a first class or software of a second class in conditional block 315. It is noted that accessing the error state includes (but is not limited to) reading from error state registers, writing to error state registers, reading from error configuration registers, writing to error configuration registers, reading from status registers, writing to status registers, reading from cloaking registers, writing to cloaking registers, reading from thresholding registers, writing to thresholding registers and so on. If the control logic does not detect an attempt by a given module to access the error state (conditional block 310, "no" leg), then method 300 returns to block 305.

If the given module is a firmware module (conditional block, "firmware" leg), then the control logic allows the access to be performed (block 320). After block 320, method 300 returns to block 305. If the given module is a software module (e.g., operating system) (conditional block 315, "software" leg), then the control logic determines if a first condition has been detected (conditional block 325). In various implementations, the first condition is a particular value being stored in a register, a specific mode being set by the firmware module, or otherwise. In other implementations, the first condition is any of various other types of conditions. It is noted that the "first condition" is also referred to herein as a "first indication".

If the first condition has been detected (conditional block 325, "yes" leg), then the control logic prevents the access from being performed (block 330). For example, in one implementation, the control logic returns all zeroes if the software module is attempting to read from registers storing the error state. In another implementation, the control logic ignores a write if the software module is attempting to write to an error state register. The control logic also optionally notifies the firmware module of the attempt to access the error state by the software module (block 335). If the first condition has not been detected (conditional block 325, "no" leg), then the control logic allows the software module to access the error state (block 340). After blocks 335 and 340, method 300 returns to block 305.

It is noted that in some implementations, the control logic implements blocks 330 and 340 differently depending on the type of access that is being attempted. For example, in one implementation, the control logic allows read accesses by the software module but prevents write accesses by the software module. In another implementation, the control logic allows read and/or write accesses to a first subset of error state registers while blocking read and/or write accesses to a second subset of error state registers. In a further implementation, if the firmware module has already accessed the error state, the control logic allows the access by the software module to the error state. Other variations of the granularity at which accesses are allowed or blocked by the control logic are possible and are contemplated.

Figure 4:
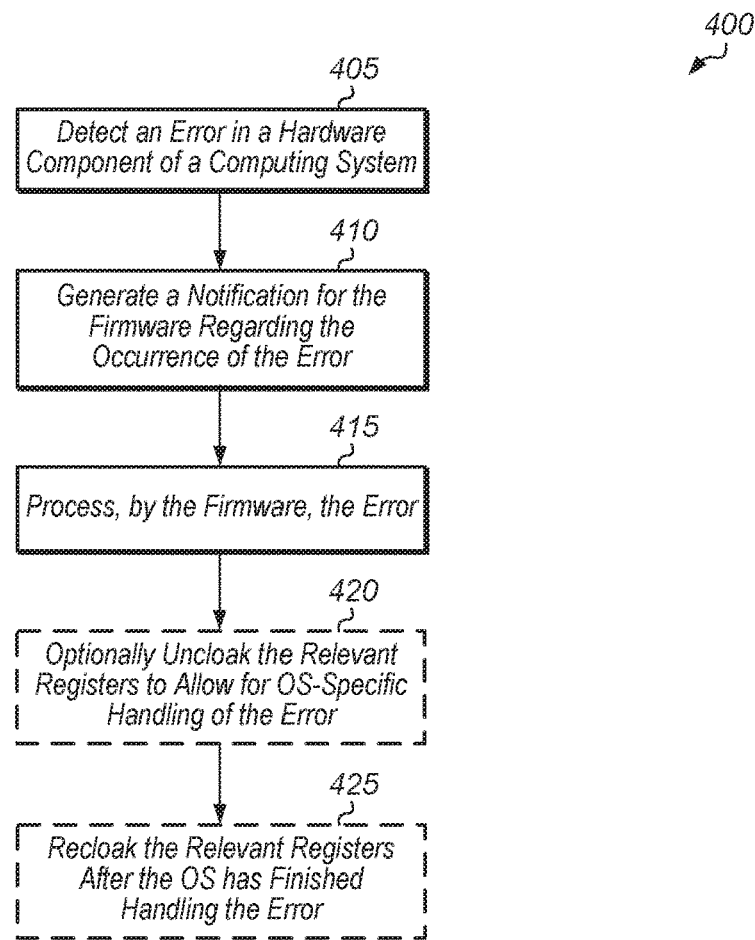
FIG. 4 is a generalized flow diagram illustrating one implementation of a method for a computing system processing an error.

Turning now to FIG. 4, one implementation of a method 400 for a computing system processing an error is shown. Error detection logic of a computing system detects an error in a hardware component of a computing system (block 405). Any of various types of errors are detected, with the type of error (e.g., memory location failure) varying from time to time during operation of the computing system and based on the type of computing system. Next, a notification is generated for the firmware regarding the occurrence of the error (block 410).

In response to receiving the notification, the firmware processes the error (block 415). The firmware processes the error using any suitable routine, with the routine varying from implementation to implementation. After processing the error, the firmware optionally uncloaks the relevant registers to allow for OS-specific handling of the error (block 420). For example, in one implementation, the OS will need to unmap a page in response to an error being detected in the memory location(s) storing the page. Next, the firmware recloaks the relevant registers after the OS has finished handling the error (block 425). After block 425, method 400 ends.

Figure 5:
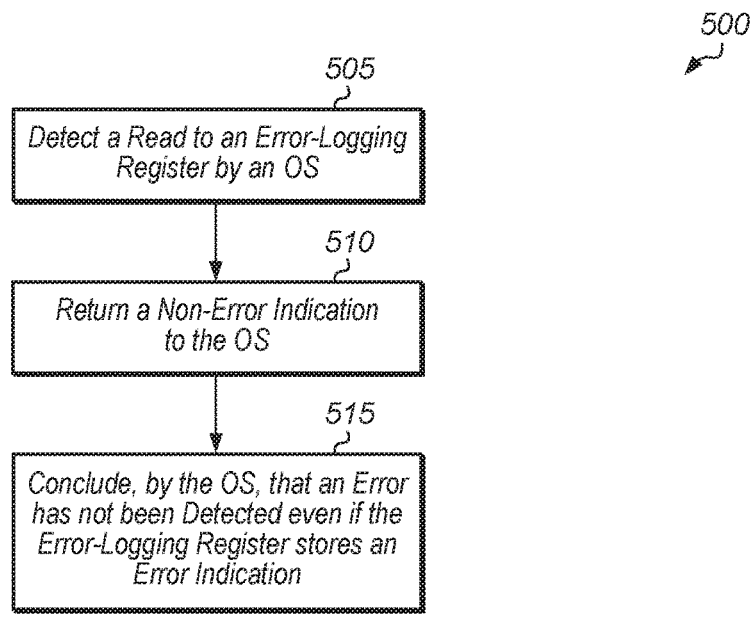
FIG. 5 is a generalized flow diagram illustrating one implementation of a method for preventing access by an OS to an error state of a computing system.

Referring now to FIG. 5, one implementation of a method 500 for preventing access by an OS to an error state of a computing system is shown. A read access to an error-logging register by an OS is detected by control logic of a computing system (block 505). In response to detecting the read access to the error-logging register, the control logic returns a non-error indication (e.g., all zeroes) to the OS (block 510). It is assumed for the purposes of this discussion that firmware has cloaked the error-logging register, which prevents the OS from having access to information about the error. It is also assumed for the purposes of this discussion that the control logic returns the non-error indication to the OS even if the error-logging register stores an error indication. In other words, the control logic gives the OS a false impression of the current error state of the system when the error-logging register stores an error indication. As a result of receiving the non-error indication, the OS concludes that an error has not been detected even if the error-logging register stores an error indication (block 515). After block 515, method 500 ends.

Figure 6:
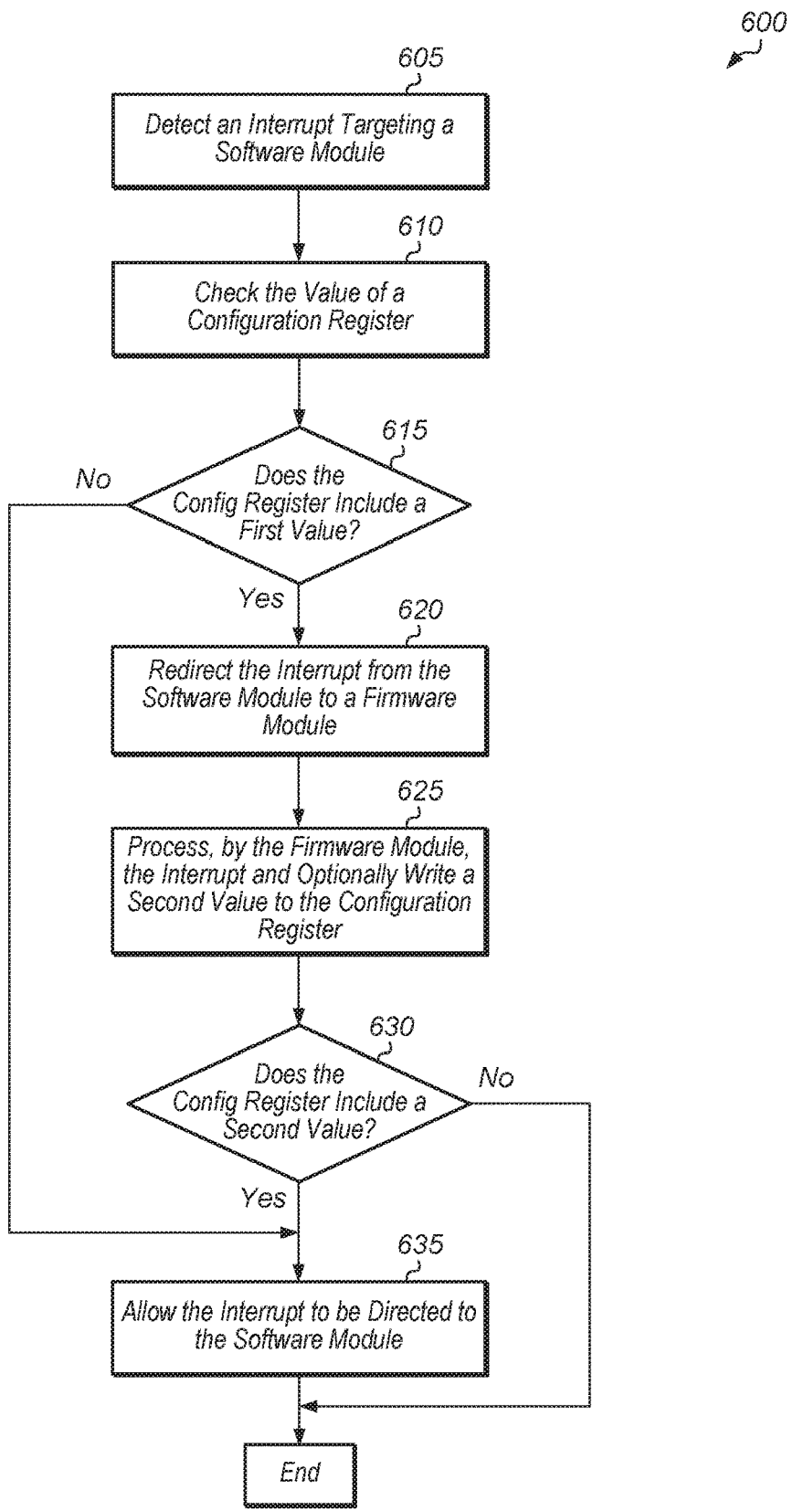
FIG. 6 is a generalized flow diagram illustrating one implementation of a method for redirecting an interrupt from a software module to a firmware module.

Turning now to FIG. 6, one implementation of a method 600 for redirecting an interrupt from a software module to a firmware module is shown. An interrupt targeting a software module (e.g., OS) is detected (block 605). In response to detecting the interrupt, control logic (e.g., microcode) of the processor checks the value of a configuration register (block 610). If the configuration register includes a first value (conditional block 615, "yes" leg), then the control logic redirects the interrupt from the software module to a firmware module (block 620). In one implementation, the first value corresponds to a platform-first mode being enabled in the configuration register. It is noted that "platform-first" is also referred to herein as "firmware-first". In one implementation, the platform-first mode is enabled if a particular bit of the configuration register is set. In other implementations, the first value corresponds to any of various other settings.

After block 620, in response to receiving the interrupt, the firmware module processes the interrupt and optionally writes a second value to the configuration register (block 625). Then, if the configuration register includes the second value (conditional block 630, "yes" leg), the control logic allows the interrupt to be directed to the software module (block 635). It is noted that in one implementation, the firmware module optionally sets a bit (i.e., the second value) in the configuration register if the firmware module wishes to notify the software module of the occurrence of the interrupt after the firmware module has processed the interrupt. Otherwise, if the firmware does not wish to notify the software module of the occurrence of the interrupt, the configuration register does not include the second value (conditional block 630, "no" leg), and then method 600 ends. If the configuration register does not include a first value (conditional block 615, "no" leg), then the control logic allows the interrupt to be directed to the software module (block 635). After block 635, method 600 ends.

Figure 7:
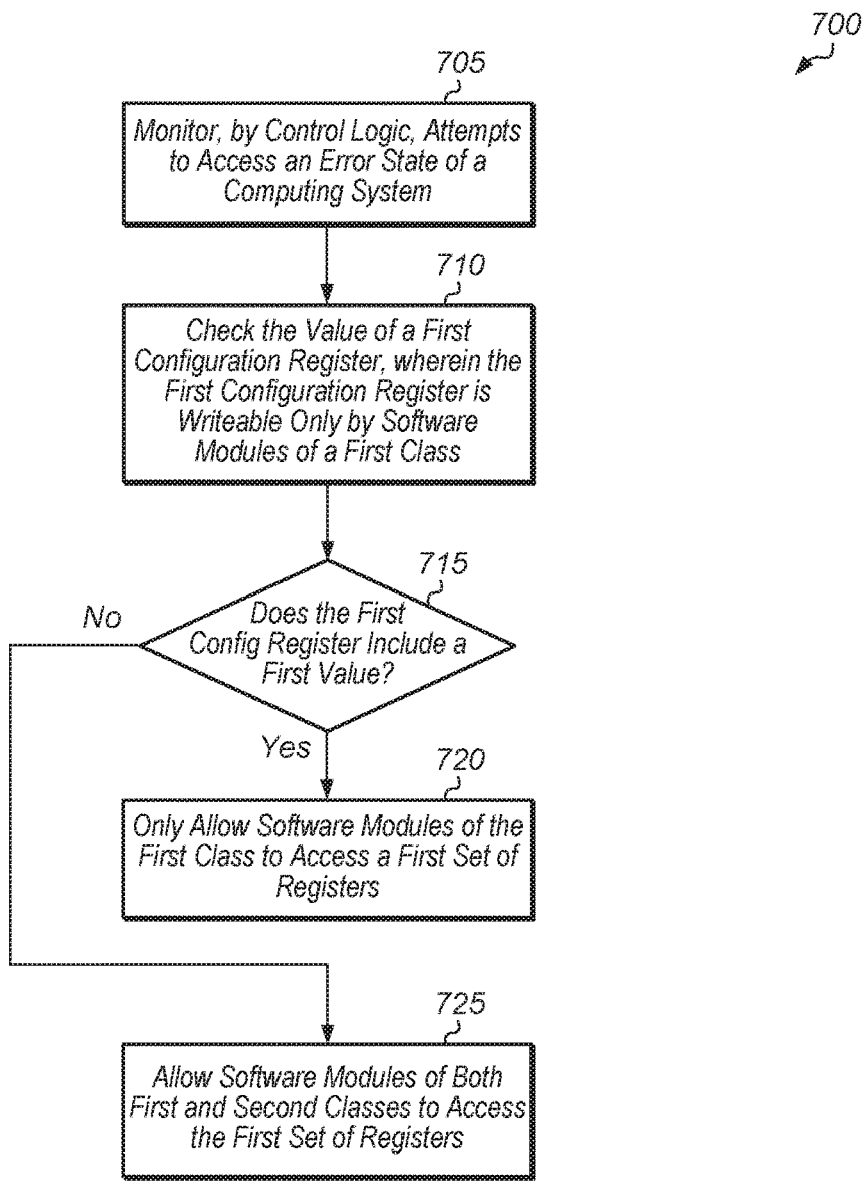
FIG. 7 is a generalized flow diagram illustrating one implementation of a method for controlling access to an error-state based on software module class type.

Referring now to FIG. 7, one implementation of a method 700 for controlling access to an error state based on software module class type is shown. Control logic monitors attempts to access an error state of a computing system (block 705). The control logic also checks the value of a first configuration register, wherein the first configuration register is writeable only by software modules of a first class (block 710). It is noted that the computing system also includes other configuration registers. In one implementation, some of these configuration registers are writeable by software modules of a second class. For example, in one implementation, a second configuration register defines notification settings, and the second configuration register is writeable by software modules of the second class.

In one implementation, the computing system classifies software modules into two separate classes. A first class (i.e., Class A) of software modules is allowed read and write access to a first set of registers. In one implementation, the first set of registers includes error state, error notification settings, and interrupt notification settings. In other implementations, the first set of registers includes other data. Also, it is possible that in some implementations, the first set of registers only includes a single register. A second class (i.e., Class B) of software modules is allowed read and/or write access to the first set of registers only when permitted to do so by the first class of software modules. In one implementation, a firmware module is assigned to the first class and all other software modules (including an OS) are assigned to the second class. In other implementations, other assignments of firmware and software modules to the first and second classes are possible and are contemplated.

If the first configuration register includes a first value (conditional block 715, "yes" leg), then the control logic only allows software modules of the first class to access a first set of registers (block 720). Otherwise, if the first configuration register does not include the first value (conditional block 715, "no" leg), then the control logic allows software modules of both first and second classes to access the first set of registers (block 725). After blocks 720 and 725, method 700 ends. It is noted that in other implementations, software modules are classified into more than two different classes of software modules. In these implementations, the control logic allows or prevents access to the error state by a third class, fourth class, and so on based on configuration settings programmed by the first class of software modules.

Figure 8:
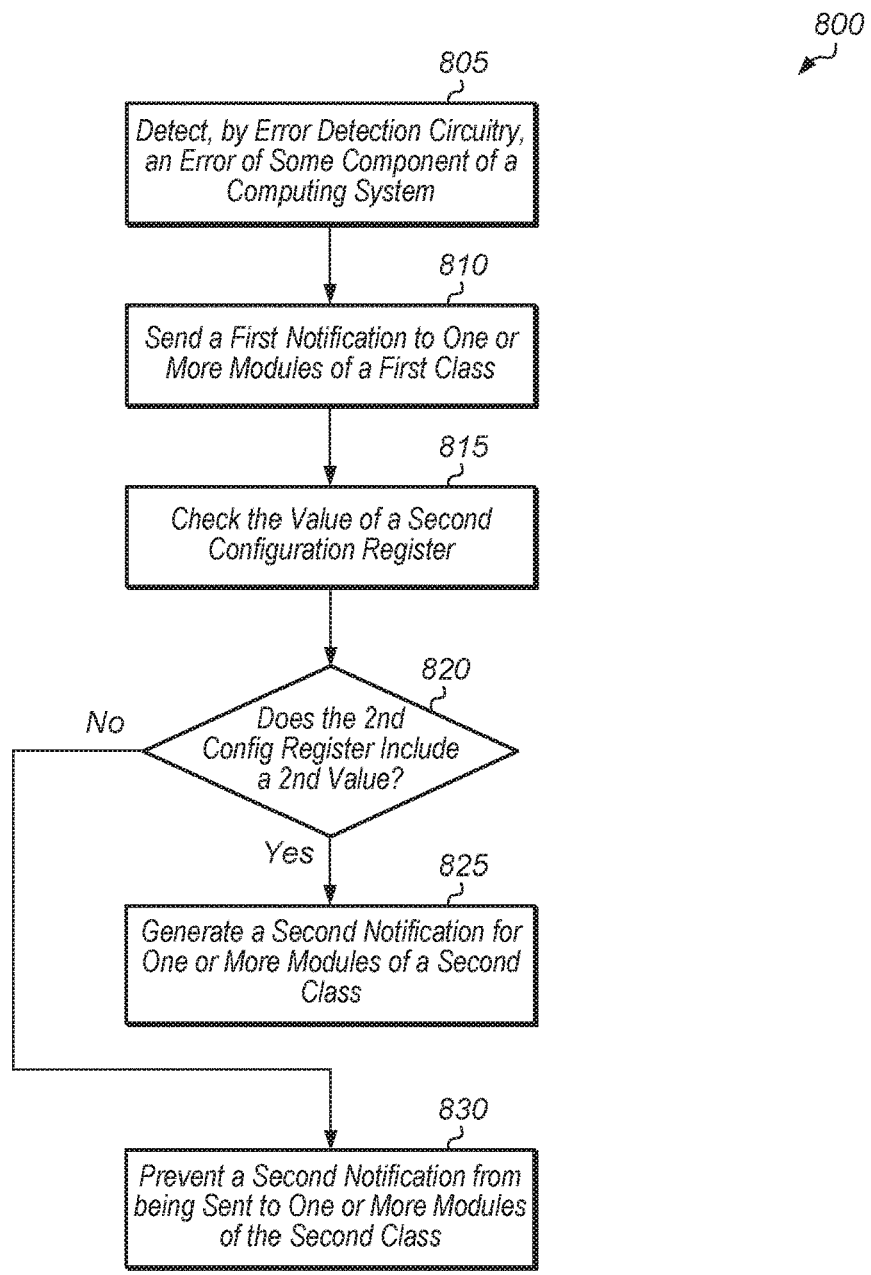
FIG. 8 is a generalized flow diagram illustrating one implementation of a method for generating error-related notifications.

Turning now to FIG. 8, one implementation of a method 800 for generating error-related notifications is shown. It is noted that in one implementation, method 800 is performed in parallel with method 700 of FIG. 7. Error detection circuitry detects an error of some component of a computing system (block 805). In response to detecting the error, control logic sends a first notification to one or more modules of a first class (block 810). In one implementation, the one or more modules of the first class include a firmware module. In other implementations, the one or more modules of the first class include other module(s).

After sending the first notification to the one or more modules of the first class, the control logic checks the value of a second configuration register (block 815). In one implementation, the second configuration is inaccessible to modules of a second class. In one implementation, modules of the second class include an OS. It is noted that the second configuration register is programmable by modules of the first class. It is also noted that in one implementation, the second configuration register is a different configuration register from the first configuration register referred to in method 700 (of FIG. 7). If the second configuration register includes a second value (conditional block 820, "yes" leg), then the control logic generates a second notification for one or modules of a second class (block 825). If the second configuration register does not include a second value (conditional block 820, "no" leg), then the control logic prevents a second notification from being sent to one or modules of the second class (block 830). After blocks 825 and 830, method 800 ends.

In various implementations, program instructions of a software application are used to implement the methods and/or mechanisms described herein. For example, program instructions executable by a general or special purpose processor are contemplated. In various implementations, such program instructions are represented by a high level programming language. In other implementations, the program instructions are compiled from a high level programming language to a binary, intermediate, or other form. Alternatively, program instructions are written that describe the behavior or design of hardware. Such program instructions can be represented by a high-level programming language, such as C. Alternatively, a hardware design language (HDL) such as Verilog is used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
a plurality of registers storing an error state for the system; and
control logic coupled to one or more execution units and the plurality of registers, wherein the control logic is configured to:
detect an attempt by a software module of a plurality of software modules executed, by circuitry of the one or more execution units, to access the error state;
determine whether the access is being attempted by a software module of a first class or by a software module of a second class, wherein each of the software module of the first class and the software module of the second class is configured to handle errors occurring on a given one of the one or more execution units;
responsive to determining that the access is being attempted by a software module of the second class:
access settings programmed by a software module of the first class; and
prevent the software module of the second class from accessing the error state responsive to detecting a first indication in the settings, wherein the first indication is inaccessible to the software module of the second class.

2. The system as recited in claim 1, wherein the control logic is configured to:
detect an interrupt targeting the software module of the second class; and
redirect the interrupt to the software module of the first class.

3. The system as recited in claim 2, wherein responsive to detecting the interrupt, the system is configured to execute program instructions of the software module of the first class to:
process the interrupt; and
after processing the interrupt, generate a notification to the software module of the second class responsive to detecting a second indication, wherein the second indication is programmed by the software module of the first class.

4. The system as recited in claim 3, wherein the first indication and the second indication correspond to specific values stored in one or more configuration registers.

5. The system as recited in claim 1, wherein the software module of the first class has a higher priority than the software module of the second class.

6. The system as recited in claim 1, wherein responsive to detecting the first indication, the control logic is further configured to only allow software modules of the first class to access the error state.

7. The system as recited in claim 6, wherein responsive to detecting a second indication, the control logic is further configured to allow software modules of both the first class and the second class to access the error state.

8. A method comprising:
storing program instructions of at least one software module of a first class and at least one software module of a second class in one or more memory devices of a computing system;
executing, by circuitry of one or more execution units, the program instructions of at least a software module of the first class and a software module of the second class;
detecting, by control logic of the computing system, an attempt by a software module executed by one of the one or more execution units to access an error state of the computing system;
determining whether the access is being attempted by a software module of the first class or by a software module of the second class, wherein each of the software module of the first class and the software module of the second class handles errors occurring on a given one of the one or more execution units;

responsive to determining that the access is being attempted by a software module of the second class:

accessing settings programmed by a software module of the first class; and preventing the software module of the second class from accessing the error state responsive to detecting a first indication in the settings, wherein the first indication is inaccessible to the software module of the second class.

9. The method as recited in claim 8, further comprising:

detecting an interrupt targeting the software module of the second class; and redirecting the interrupt to the software module of the first class.

10. The method as recited in claim 9, wherein responsive to detecting the interrupt, the method further comprising:

processing the interrupt; and after processing the interrupt, generating a notification to the software module of the second class responsive to detecting a second indication, wherein the second indication is programmed by the software module of the first class.

11. The method as recited in claim 10, wherein the first indication and the second indication correspond to specific values stored in one or more configuration registers.

12. The method as recited in claim 8, wherein the software module of the first class has a higher priority than the software module of the second class.

13. The method as recited in claim 8, further comprising only allowing software modules of the first class to access the error state responsive to detecting the first indication.

14. The method as recited in claim 13, further comprising allowing software modules of both the first class and the second class to access the error state responsive to detecting a second indication.

15. An apparatus comprising:

one or more memories storing program instructions of a plurality of software modules, wherein the plurality of software modules comprise at least one software module of a first class and at least one software module of a second class;

control logic; and one or more execution units coupled to the memory, the one or more execution units comprising circuitry configured to execute the program instructions of at least a software module of the first class and a software module of the second class;

wherein the apparatus is configured to:

detect an attempt by a software module of the plurality of software modules executed by one of the one or more execution units to access an error state;

determine whether the access is being attempted by a software module of the first class or by a software module of the second class, wherein each of the software module of the first class and the software module of the second class is configured to handle errors occurring on a given one of the one or more execution units;

responsive to determining that the access is being attempted by a software module of the second class:

access settings programmed by a software module of the first class; and prevent the software module of the second class from accessing the error state responsive to detecting a first indication in the settings, wherein the first indication is inaccessible to the software module of the second class.

16. The apparatus as recited in claim 15, wherein the apparatus is further configured to:

detect an interrupt targeting the software module of the second class; and redirect the interrupt to the software module of the first class.

17. The apparatus as recited in claim 16, wherein responsive to detecting the interrupt, the apparatus is configured to execute program instructions of the software module of the first class to:

process the interrupt; and after processing the interrupt, generate a notification to the software module of the second class responsive to detecting a second indication, wherein the second indication is programmed by the software module of the first class.

18. The apparatus as recited in claim 17, wherein the first indication and the second indication correspond to specific values stored in one or more configuration registers.

19. The apparatus as recited in claim 15, wherein the software module of the first class has a higher priority than the software module of the second class.

20. The apparatus as recited in claim 15, wherein responsive to detecting the first indication, the apparatus is further configured to only allow software modules of the first class to access the error state.

* * * * *